United States Patent [19]

Perkins

[11] Patent Number: 5,084,977
[45] Date of Patent: Feb. 4, 1992

[54] SAW GUIDE APPARATUS

[76] Inventor: Robert E. Perkins, 2 Kelly La., Pisgah Forest, N.C. 28768

[21] Appl. No.: 673,307

[22] Filed: Mar. 22, 1991

[51] Int. Cl.⁵ .............................. B23D 51/02
[52] U.S. Cl. ................................. 30/374; 30/371; 83/745
[58] Field of Search ............... 83/745; 30/374, 373, 30/375, 376, 371; 409/178, 182; 33/464; 144/134 D, 136 C

[56] References Cited

U.S. PATENT DOCUMENTS

| | | | |
|---|---|---|---|
| 3,869,951 | 3/1975 | Litwin | 83/745 |
| 4,077,292 | 3/1978 | Cole | 83/745 |
| 4,202,233 | 5/1980 | Larson | 30/376 |
| 4,291,602 | 9/1981 | Fast et al. | 83/745 |
| 4,335,512 | 6/1982 | Sheps et al. | 30/376 |
| 4,397,089 | 8/1983 | Pease | 30/373 |
| 4,552,192 | 11/1985 | Eaves | 144/136 C |
| 4,624,054 | 11/1986 | Edwards | 30/374 |
| 4,638,564 | 1/1987 | Burrows | 33/464 |

Primary Examiner—Mark Rosenbaum
Assistant Examiner—Hwei-Siu Payer
Attorney, Agent, or Firm—Leon Gilden

[57] ABSTRACT

An apparatus arranged for association with a saw plate member, wherein an elongate guide member is slidably and reciprocatably mounted in a parallel orientation relative to a saw blade, wherein the guide member includes a guide plate orthogonally oriented relative to the rotary saw of the organization to effect guiding of the saw blade in an orthogonal orientation relative to a portion of wood to be severed to permit ease and alignment of the saw for cross-cutting of the aforenoted workpiece.

1 Claim, 4 Drawing Sheets

SAW GUIDE APPARATUS

BACKGROUND OF THE INVENTION

1. Field of the Invention

The field of invention relates to saw guide apparatus, and more particularly pertains to a new and improved saw guide apparatus wherein the same is arranged for orthogonally orienting a saw blade relative to an elongate workpiece for cross-cutting of the wood workpiece.

2. Description of the Prior Art

Saw guide apparatus of various types have been utilized in the prior art. Particularly in rip sawing of wood workpieces, a guide structure is arranged typically in a parallel relationship relative to a saw blade. The instant organization provides for a slidably mounted saw guide arranged for properly orienting a saw member in a ripping procedure relative to the workpiece. Examples of the prior art include U.S. Pat. No. 4,790,072 to Edwards wherein a saw guide include a pivotal protractor means for orienting the saw relative to a workpiece, wherein the protractor is pivotally mounted about an elongate rod longitudinally mounted relative to a support plate of the saw member.

U.S. Pat. No. 4,638,564 to Burrows sets forth a measuring guide for a saw structure, wherein an end of a rule member serves as an abutment for a straight edge for use as a guide for a saw.

U.S. Pat. No. 4,811,643 to Krieger sets forth a guide for a saw member, wherein the guide is arranged in abutment against an edge surface of a wooden workpiece to orient a saw that travels relative to the abutment member.

U.S. Pat. No. 4,509,398 to Mason sets forth a further example of a cutter structure utilizing a plate to arranged a flange relative to a plate structure to provide ease of repetitive cutting of block members.

As such, it may be appreciated that there continues to be a need for a new and improved saw guide apparatus as set forth by the instant invention which addresses both the problems of ease of use as well as effectiveness in construction in properly orienting a saw guide for ripping of a workpiece in a wood cutting event and in this respect, the present invention substantially fulfills this need.

SUMMARY OF THE INVENTION

In view of the foregoing disadvantages inherent in the known types of saw guide apparatus now present in the prior art, the present invention provides a saw guide apparatus wherein the same is arranged for orienting a saw in a ripping action relative to a wooden workpiece. As such, the general purpose of the present invention, which will be described subsequently in greater detail, is to provide a new and improved saw guide apparatus which has all the advantages of the prior art saw guide apparatus and none of the disadvantages.

To attain this, the present invention provides an apparatus arranged for association with a saw plate member, wherein an elongate guide member is slidably and reciprocatably mounted in a parallel orientation relative to a saw blade, wherein the guide member includes a guide plate orthogonally oriented relative to the rotary saw of the organization to effect guiding of the saw blade in an orthogonal orientation relative to a portion of wood to be severed to permit ease and alignment of the saw for cross-cutting of the aforenoted workpiece.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved saw guide apparatus which has all the advantages of the prior art saw guide apparatus and none of the disadvantages.

It is another object of the present invention to provide a new and improved saw guide apparatus which may be easily and efficiently manufactured and marketed.

It is a further object of the present invention to provide a new and improved saw guide apparatus which is of a durable and reliable construction.

An even further object of the present invention is to provide a new and improved saw guide apparatus which is susceptible of a low cost of manufacture with regard to both materials and labor, and which accordingly is then susceptible of low prices of sale to the consuming public, thereby making such saw guide apparatus economically available to the buying public.

Still yet another object of the present invention is to provide a new and improved saw guide apparatus which provides in the apparatuses and methods of the prior art some of the advantages thereof, while simultaneously overcoming some of the disadvantages normally associated therewith.

Still another object of the present invention is to provide a new and improved saw guide apparatus wherein the same is arranged relative to a side edge of a workpiece for ripping of the workpiece and is subsequently displaced relative to a support plate relative to a saw guide structure to accommodate positioning of the saw guide during ripping of the workpiece.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
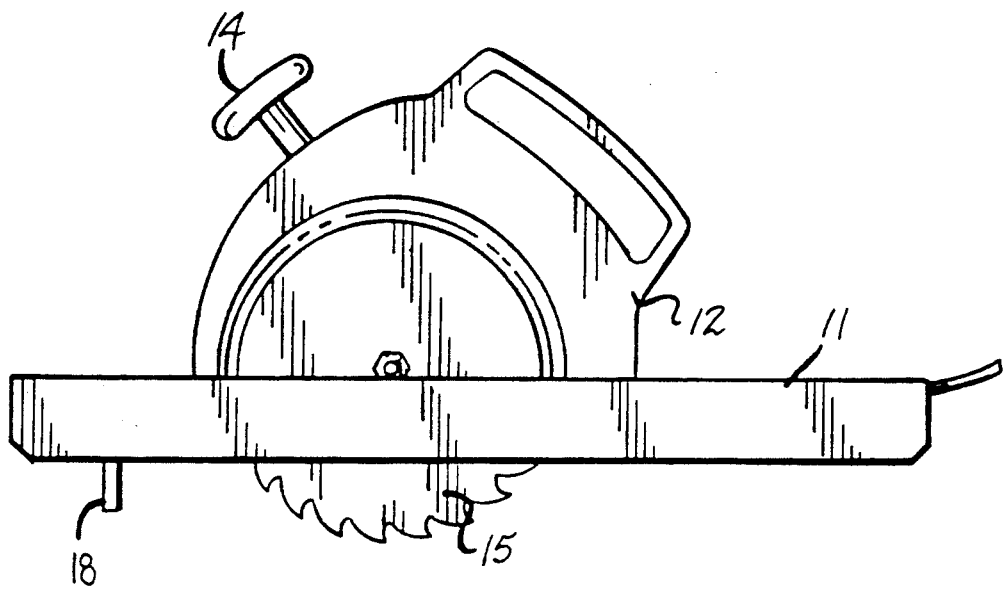
FIG. 1 is an orthographic side view of the instant invention.
Figure 2:
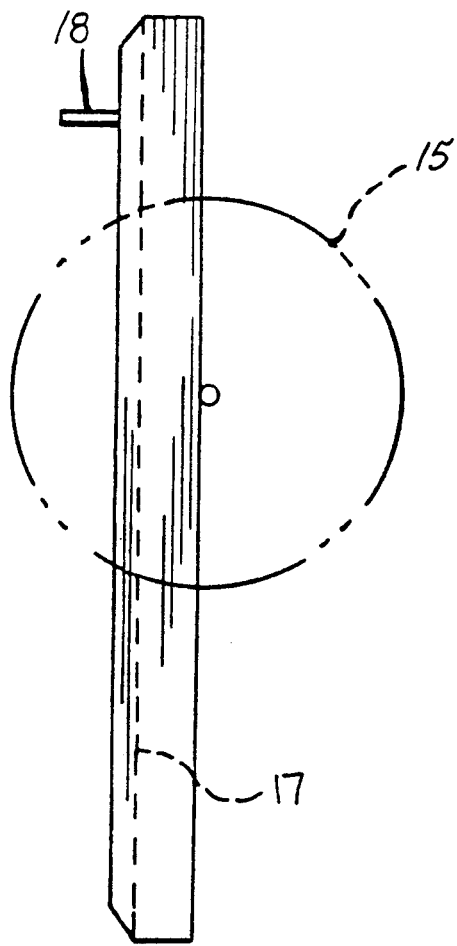
FIG. 2 is an orthographic side view of the invention illustrating the orientation of the guide tail groove in cooperation with the abutment plate of the guide member utilized by the instant invention.
Figure 3:
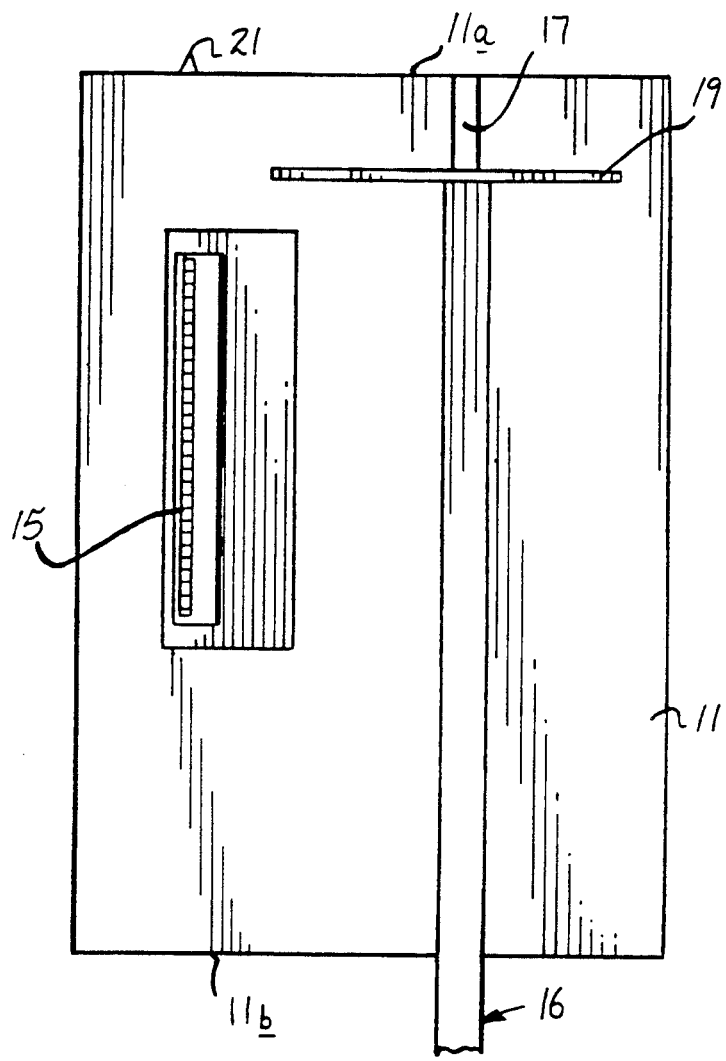
FIG. 3 is an orthographic bottom view of the instant invention.
Figure 4:
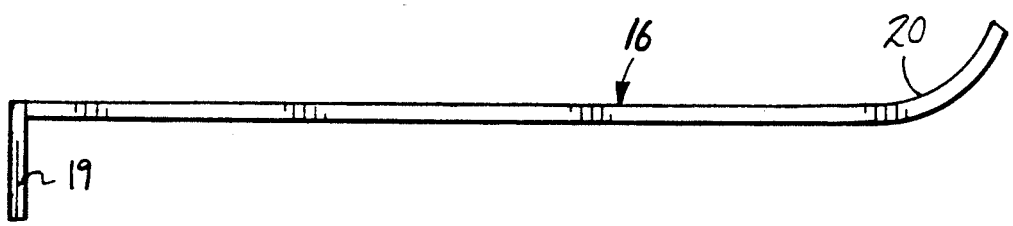
FIG. 4 is an orthographic side view of the guide member utilized by the instant invention.

With reference now to the drawings, and in particular to FIGS. 1 to 7 thereof, a new and improved saw guide apparatus embodying the principles and concepts of the present invention and generally designated by the reference numeral 10 will be described.

Figure 5:
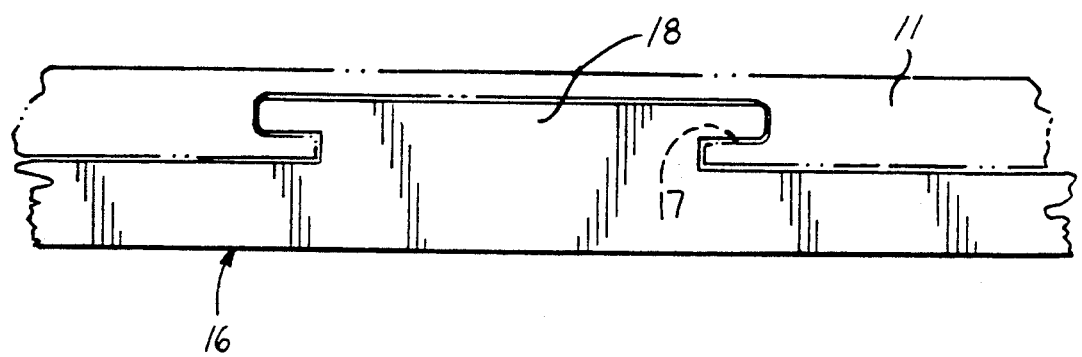
FIG. 5 is an orthographic cross-sectional configuration of the dove tail inter-relationship of the guide member and the plate member.
Figure 6:
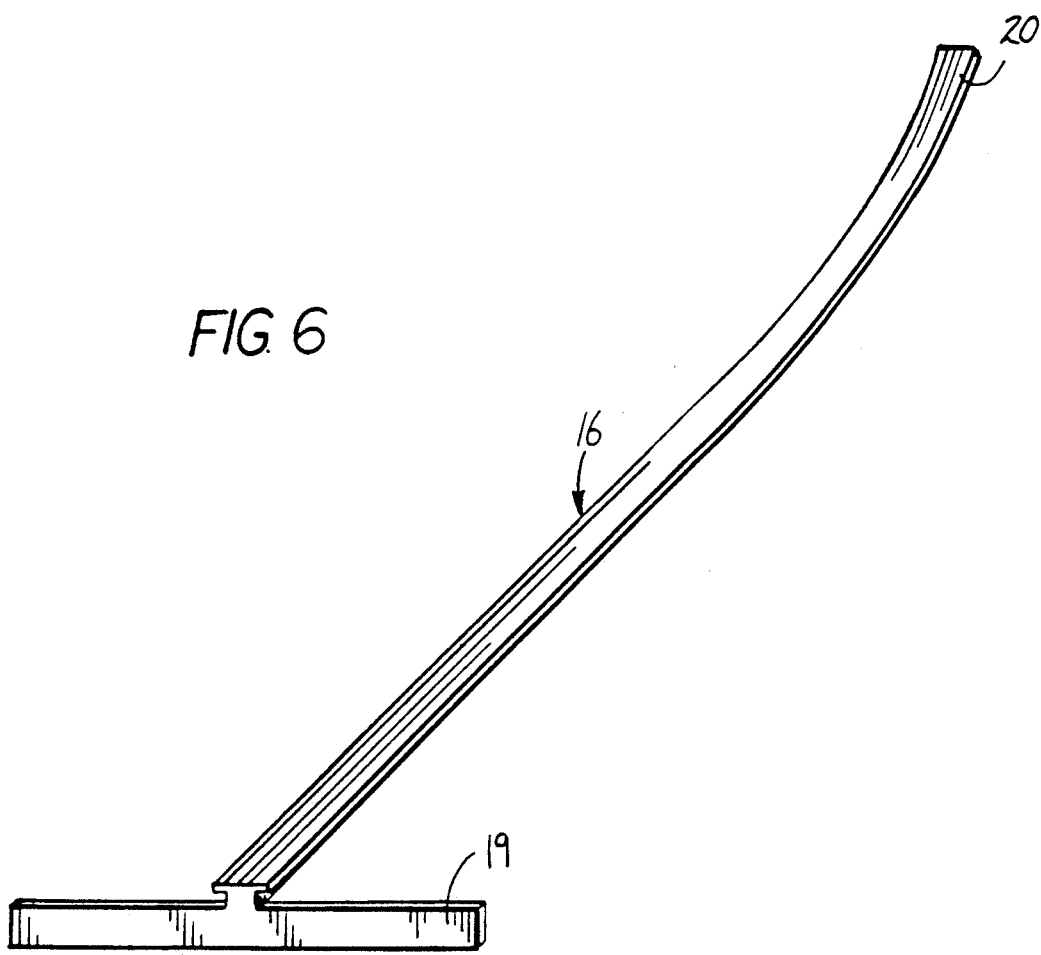
FIG. 6 is an isometric illustration of the guide member of the instant invention.

More specifically, the saw guide apparatus 10 of the instant invention essentially comprises a saw plate member 11 defining a planar bottom surface, with a forward edge 11a and a rear edge 11b. The forward edge 11a includes a saw indicator guide arrow 21 projecting orthogonally relative to the forward edge 11a, with the arrow in alignment with an associated rotary saw 15 projecting through the plate member 11. The rotary saw 15 is mounted within a saw housing and drive 12 that includes a rear handle 13 and a forward handle 14 oriented towards respective forward inner edges 11a and 11b of the plate member 11 to permit manual projection of the apparatus in a cross-cutting procedure when a workpiece is positioned in abutment against the forward edge 11a. A guide member 16 is slidably mounted throughout the plate member 11 and is mounted in a sliding relationship within a dove tail groove 17 that is oriented parallel to a plane defined by the rotary saw blade 15 and spaced relative thereto a predetermined spacing. A guide plate 19 is orthogonally mounted to a forward end of the guide member 16 and is oriented orthogonally relative to the bottom surface of the plate member 11. The dove tail groove 17 slidably receives a complementary "T" shaped projection 18 formed to a top end of the guide member 16, in a manner as illustrated in FIG. 5. An arcuate guide handle 20 projects upwardly relative to the top surface of the plate member 11 and rearwardly of the guide member 16. The projection 18 is coextensive with the guide member 16, whereupon positioning of the guide plate 19 relative to a side edge of a workpiece that is positioned adjacent the forward edge 11a and the plate member 11 is directed across the workpiece, whereupon the guide member 16 is slidably directed rearwardly thereof. The guide plate 19 is spaced from the rotary saw blade 15 a further spacing less than the predetermined spacing between the guide member 16 and the blade 15 to permit the guide plate 19 to pass unobstructed along the bottom surface of the plate member 11.

Figure 7:
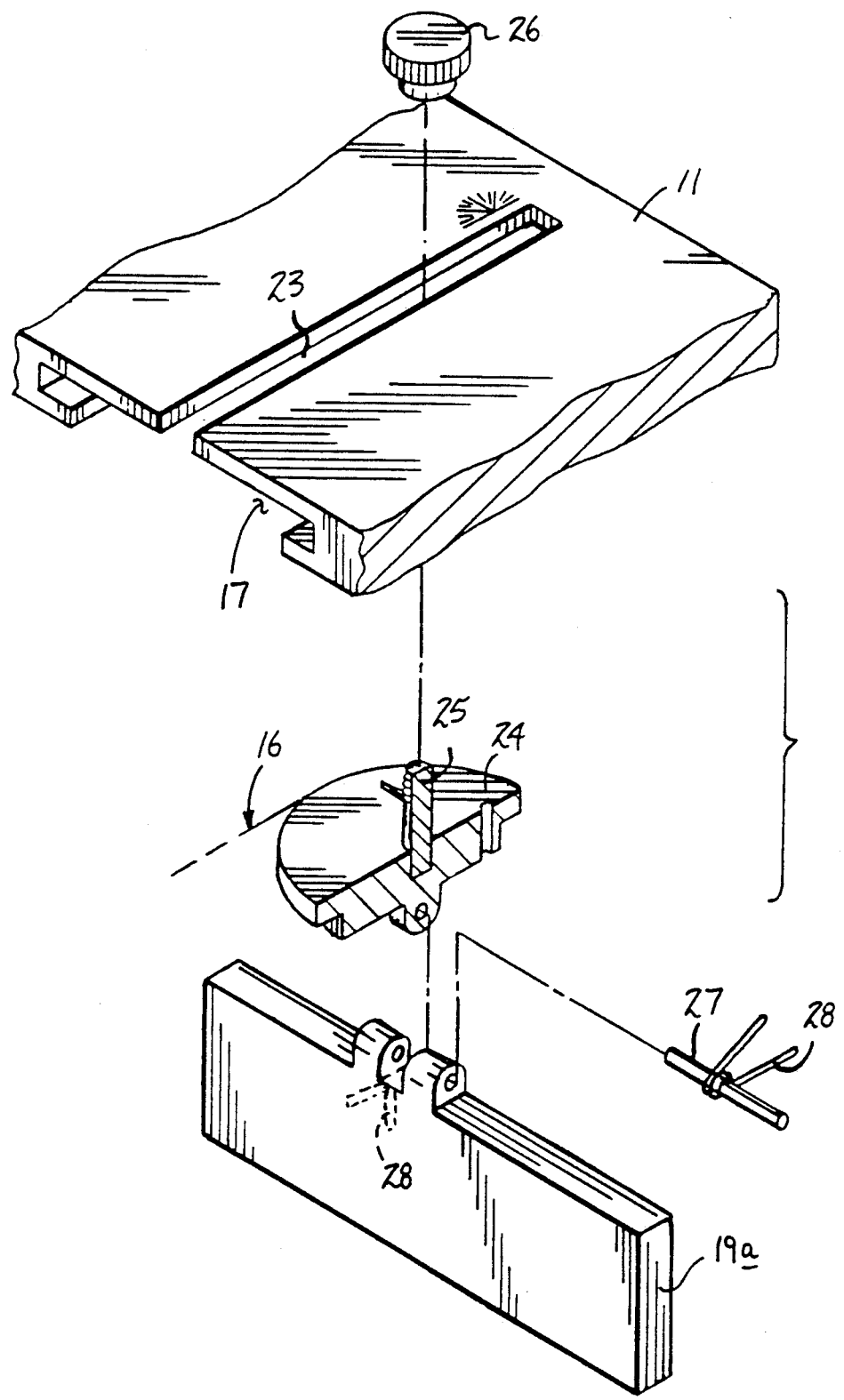
FIG. 7 is an exploded isometric illustration of a modified abutment plate structure utilized by the instant invention.

With reference to FIG. 7, the modified plate member 111 includes a slot 23 that extends through the plate member 111 medially of the dove tail groove 17 to receive the guide member 16. Rotatably mounted within the guide member 16 is a support boss 24 that includes a threaded shaft 25 that is orthogonally directed into a top surface of the support boss 24 projecting through the slot 23 and secured at a predetermined relative rotative orientation relative to the guide member 16 by the securement fastener 26 that is threadedly and rotatably mounted onto the threaded shaft 25 above the top surface of the modified plate member 111. The support boss 24 includes a downwardly extending apertured projection that is received between a plurality of spaced ears formed to a top edge of the modified guide plate 19a. An axle 27 is directed through the ears and the downwardly extending projection of the support boss 24 to permit pivotment of the guide plate 19a. Further, a spring member 28 mounted about the axle 27 is arranged to normally bias the guide plate in an orthogonal orientation relative to the plate member 111. In this manner, the guide plate 19a may be rotatably oriented relative to a wooden workpiece to permit angular ripping of the workpiece relative to a side edge thereof, as well as permitting deflection of the guide plate 19a upon directing the saw member across the workpiece.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A saw guide apparatus comprising, in combination, a plate member, the plate member including a planar bottom surface, a forward edge and a rear edge, wherein the forward and rear edges are arranged in parallel relationship relative to one another, and a saw housing and drive mounted on the top surface of the plate member, with a rotary saw blade orthogonally projecting through the plate member extending downwardly from the top surface thereof in an orthogonal relationship relative to the forward edge and rear edge, and handle means mounted to the saw housing and drive for directing the plate member and rotary saw across a workpiece, and guide means slidably mounted within the plate member spaced from the rotary saw blade, and wherein the guide means includes a dove tail groove coextensively directed through the plate member extending from the bottom surface of the plate member, with the dove tail groove arranged parallel to the rotary saw blade and spaced therefrom a predetermined spacing, and the guide means further including a guide member slidably received within the dove tail groove, wherein the guide member includes a "T" shaped projection slidably received within the dove tail groove, and the guide member including a guide plate orthogonally mounted to a forward terminal end of the guide member, with the guide plate extending downwardly to the bottom surface of the guide plate and spaced from the saw blade a further spacing less than the predetermined spacing, wherein the guide plate is arranged for abutment against a side edge of the workpiece to permit ripping of the workpiece, and wherein the guide member includes an arcuate handle extending rearwardly of the guide member spaced above a top surface of the plate member for enhanced ease of manual grasping and manipulation of the guide member, and wherein the dove tail groove includes a slot through the plate member oriented medially of the dove tail groove, and a support boss rotatably mounted within the guide member, with the boss including a threaded shaft extending through the slot, and a fastener member mounted to the threaded shaft overlying the top surface of the plate member to permit rotative adjustment of the support boss within the dove tail groove, and the support boss including an apertured projection extending downwardly from the support boss, and the guide plate including a top edge, and the top edge including a plurality of spaced ears receiving the projection therebetween, and an axle directed through the ears and the projection to pivotally mount the guide plate to the support boss, and spring means wound about the axle and positioned between a bottom surface of the support boss and the guide plate to bias the guide plate in an orthogonal relationship relative to the bottom surface of the plate member.

* * * * *